(12) United States Patent
Nakajima

(10) Patent No.: US 7,006,246 B1
(45) Date of Patent: Feb. 28, 2006

(54) IMAGE PROCESSING METHOD, APPARATUS, RECORDING MEDIUM AND CHART THEREFOR

(75) Inventor: Nobuyuki Nakajima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1019 days.

(21) Appl. No.: 09/662,168

(22) Filed: Sep. 14, 2000

(30) Foreign Application Priority Data

Sep. 17, 1999 (JP) ................................. 11-263917
Sep. 17, 1999 (JP) ................................. 11-263919

(51) Int. Cl.
*H04N 1/04* (2006.01)
(52) U.S. Cl. .................. 358/1.9; 358/406; 358/474
(58) Field of Classification Search .............. 358/1.9, 358/1.14, 504, 505, 527, 406, 474, 488, 296; 382/287, 289, 291; 710/15, 19
See application file for complete search history.

(56) References Cited

U.S. PATENT DOCUMENTS 5,583,644 A    12/1996 Sasanuma et al. .......... 358/296
6,034,788 A    3/2000 Sasanuma et al. .......... 358/406
6,404,517 B1 * 6/2002 Chao .......................... 358/504
2004/0174574 A1 * 9/2004 Okuda ........................ 358/504

FOREIGN PATENT DOCUMENTS

JP    2-643951    5/1997

* cited by examiner

*Primary Examiner*—Scott A. Rogers
(74) *Attorney, Agent, or Firm*—Fitzpatrick, Cella, Harper & Scinto

(57) ABSTRACT

An image processing method includes a step of generating a calibration condition for an image forming unit, a step of generating a calibration condition for a reading unit, and a discrimination step. The calibration condition for the image forming unit is generated by reading a first chart formed by the image forming unit with the reading unit and generating a calibration condition for the image forming unit based on the data obtained by the reading. The calibration condition for the reading unit is generated using a second chart printed in advance. In the discriminating step, the first and second charts are discriminated. The discrimination step discriminates whether a chart read in each of the step of generating the calibration condition for the image forming unit and the step of generating the calibration condition for the image reading unit is an appropriate chart.

10 Claims, 22 Drawing Sheets

IMAGE PROCESSING METHOD, APPARATUS, RECORDING MEDIUM AND CHART THEREFOR

BACKGROUND OF THE INVENTION

1. Field of the Invention

The present invention relates to an image processing method for reading a chart and generating correcting conditions based on the obtained data, and an apparatus and a recording medium therefor.

2. Related Background Art

In the printing apparatus, it is already known that the printing characteristics may fluctuate depending on the environmental conditions such as the temperature and humidity of the environment in which the apparatus is used. In addition to such environmental conditions, the printing characteristics may be varied after use of the printing apparatus over a certain period. For example, in the printing apparatus based on the electrophotographic process, the photosensitive characteristics of the photosensitive drum vary according to the environmental conditions as mentioned above or by prolonged use, whereby the printing characteristics such as gradation observed on the printed image shifts from the desired value. Also, the printing apparatus utilizing an ink jet system is known to show printing characteristic changes because of a change in the discharge characteristics of the printing head.

Calibration is executed for such change in the printing characteristics, but it is not limited to the change in the printing characteristics of the individual printing apparatus. In an information processing system in which plural printing apparatus are connected through a network, the difference in the above-mentioned printing characteristics between such printing apparatus may become an issue, and the calibration becomes necessary in order to reduce the difference in the printing characteristics among the printing apparatus. Conventionally, such calibration is basically executed according to an instruction entered by the user. For example, in case the user observes that the gradation of the printed image is different from the desired one, the user instructs the execution of calibration on an operation image displayed on the printing apparatus or on a personal computer (PC).

For a highly precise calibration, it is necessary to measure, with a high precision, a calibration chart outputted by the printing apparatus.

It is therefore necessary to stabilize and optimize the characteristics of the scanner apparatus used for reading the chart.

However, the calibration for the scanning apparatus for stabilizing and optimizing the characteristics thereof has not conventionally been executed.

Consequently, a highly precise calibration for the printer apparatus cannot be achieved if the characteristics of the scanner apparatus are deviated.

SUMMARY OF THE INVENTION

An object of the present invention is to enable calibration of the reading unit, thereby enabling constantly precise calibration of the image forming unit.

Another object of the present invention is to improve convenience of use of the calibration process for the reading unit and that for the image forming unit.

Still another object of the present invention is to prevent misuse of the chart to be used in the calibration process for the reading unit and that for the image forming unit.

The foregoing objects can be attained, according to the present invention, by an image processing method comprising:

a step of generating a calibration condition for an image forming unit, by reading a first chart formed by the image forming unit with a reading unit and generating a calibration condition for the image forming unit, based on the data obtained by the reading;

a step of generating a calibration condition for the reading unit, using a second chart printed in advance; and a discrimination step of discriminating the first and second charts;

wherein the discrimination step discriminates whether a chart read in each of the step of generating a calibration condition for the image forming unit and the step of generating a calibration condition for the image reading unit is an appropriate chart.

Still another object of the present invention is to improve the storability of a chart to be used for calibrating the reading unit thereby maintaining the accuracy of the calibration process.

The foregoing object can be attained, according to the present invention, by an image processing method for entering read data obtained by reading a chart printed in advance with a reading unit and generating calibration data for calibrating the reading unit based on the read data:

wherein the chart is rendered foldable with the printed surface thereof inward and is not printed with a data patch in the vicinity of the folding portion, and the chart is stored in an operation manual of the image processing method in a state folded in the folding portion with the printed surface thereof inward.

Still other objects of the present invention, and the features thereof, will become fully apparent from the following detailed description, which is to be taken in conjunction with the accompanying drawings.

DETAILED DESCRIPTION OF THE PREFERRED EMBODIMENTS

Now the present invention will be clarified in detail by embodiments thereof with reference to the accompanying drawings.

The following embodiments employ a color laser beam printer as an example of the printer constituting the system, but the present invention is naturally applicable likewise to other printers such as a color ink jet printer.

First Embodiment

Figure 1:
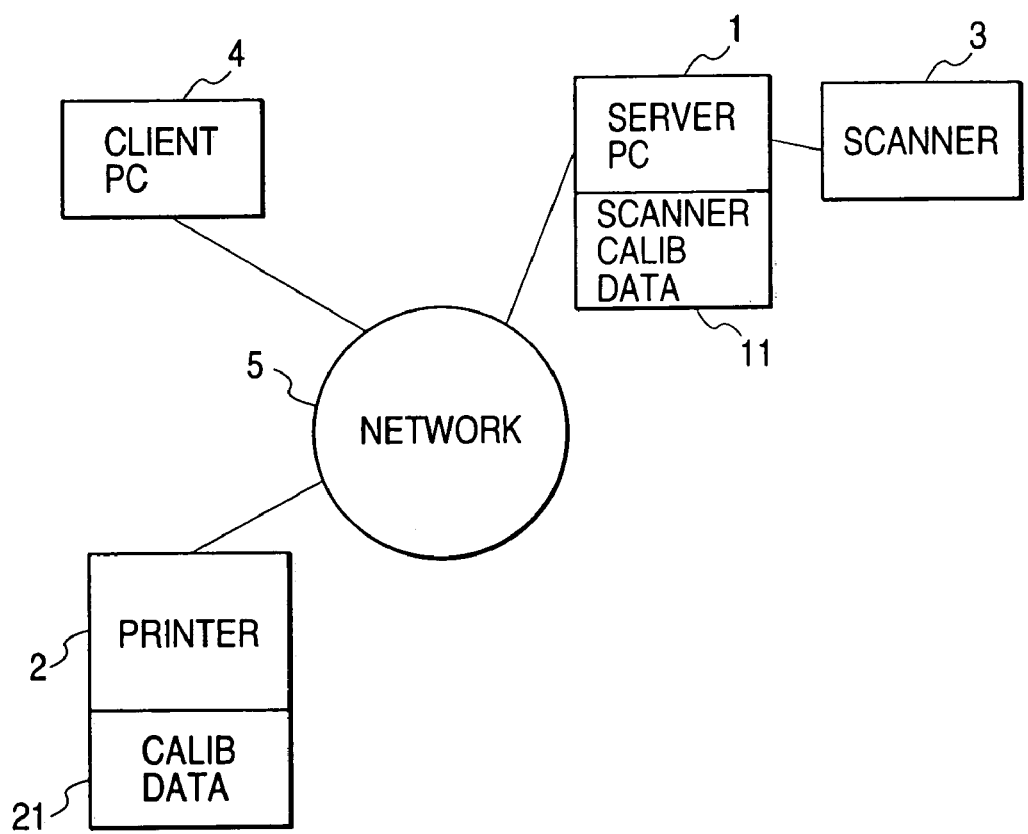
FIG. 1 is a block diagram showing an example of configuration of a printer calibration system.

FIG. 1 is a block diagram showing the configuration of a printer calibration system constituting the present embodiment.

In the present embodiment, the form of connection in the network and the protocol therein are not particularly referred to, but there may be adopted any connection form and protocol in a similar manner.

Referring to FIG. 1, a software realizing the present system is installed in a server PC 1, which is connected to a network 5.

A scanner calibration data storage unit 11 stores scanner calibration data (explained in more detail later) stored in the server PC 1.

A printer 2 connected to the network 5 is subjected to the calibration in the present system, and is rendered capable of printing operation from instructions from plural PC's connected on the network. A calibration data storage unit 21 provided in the printer 2 is used for storing calibration data to be explained later, when such data are downloaded from the PC 1.

A scanner 3 connected to the server PC 1 is used as a densitometer for measuring the density of patch data outputted by the printer 2, but it is also usable for its original purpose of entering an original. In measuring the patch data outputted by the printer, the scanner 3 is calibrated by a scanner chart prepared in advance for enabling stable density measurement by the server PC 1, and the scanner calibration data thus prepared are stored in the scanner calibration data storage unit 11 mentioned above. A client PC 4 connected to the network is used for preparation and editing of desired print data and for instructing a printing operation. In general, the printer calibration is executed by a system manager on the server PC 1, while the ordinary printing of the print data is executed in the client PC 4.

In the following there will be explained, with reference to FIG. 4, the process flow of printer calibration in the above-described configuration.

A step S41 outputs patch data from the server PC 1 to the printer 2, thereby causing the printer 2 to output a printer chart. In this operation, an object printer is specified, assuming a situation where plural printers are connected on the network. This is achieved according to the rule of network management which is not explained herein.

Figure 6:
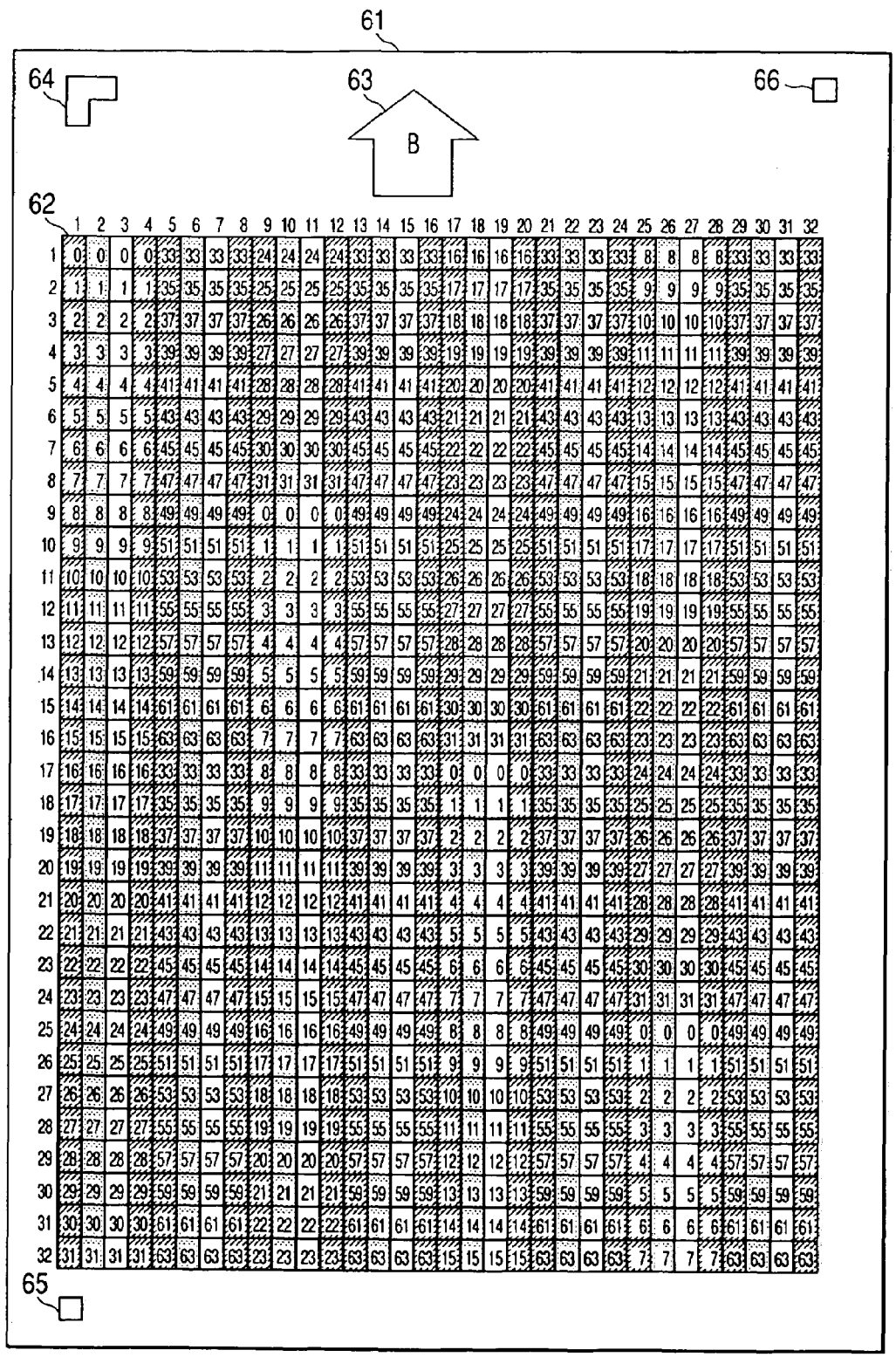
FIG. 6 is a view showing an example of the printer chart to be used in the printer calibration system.
Figure 10:
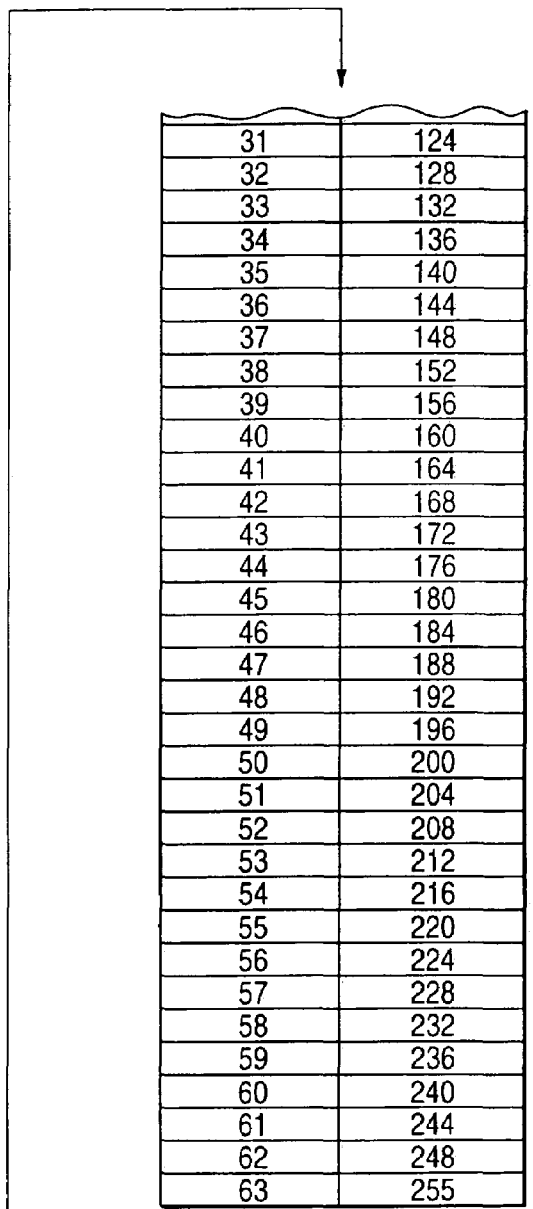
FIG. 10 is a table showing the correspondence between output signals of patch data and arrangement numbers.

FIG. 6 shows an example of the printer chart. In FIG. 6, a printer chart is shown in a frame 61 of A4 size in this case. A data portion 62 for knowing the density characteristics of the printer consists, in the example shown in FIG. 6, of 1024 blocks in total, composed of 32 divisions in the vertical and lateral directions. In the lateral direction, the blocks are arranged respectively for cyan, magenta, yellow and black which are basic colors of the toner. The number in each block is an arrangement suffix or number, which is correlated with the actual value as shown in FIG. 10. More specifically, the arrangement number 0 corresponds to an actual output data 0, the number 32 corresponds to an actual output data 128, and the number 63 corresponds to an actual output data 255. In a system of 8 bits for each of CMYK, there are employed values from 0 to 255, but the values in FIG. 10 may be modified for another number of bits.

More specifically in FIG. 6, in the highlight side with the arrangement numbers from 0 to 31, there are provided 4 blocks of 32 gradation levels, and, in the shadow side with the arrangement numbers from 33 to 63, there are provided 8 blocks of 16 gradation levels. The difference in the number of gradation levels between the highlight and shadow sides is based on a fact that the present system required more detailed gradation information in the highlight side than in the shadow side. Also the difference in the number of arranged blocks between the highlight and shadow sides is based on a fact that the fluctuation in the input value of the scanner tends to be larger in the highlight side than in the shadow side.

In FIG. 6, discrimination information 63 is provided for the discrimination to be explained in the following. The discrimination information is shaped as an arrow for indicating the direction of the chart when it is placed on the original supporting table of the scanner apparatus, and contains therein a letter "B" for causing the user to identify this chart as a printer chart.

In FIG. 6, registration marks 64, 65, 66 are provided for detecting whether the chart is properly placed on the original supporting table of the scanner.

The above-described printer chart is outputted from the printer 2 in response to an instruction given from the server PC 1 through the network. The chart may be generated by storing information for constituting the patch data of the above-described format in the printer 2 and generating the patch data from such information in response to the instruction from the PC 1, or by generating the patch data by transmitting the information for constituting the patch data from the PC 1 to the printer 2. The information for constituting the patch data is dependent on the command system belonging to the printer 2, but will not be explained further.

Figure 4:
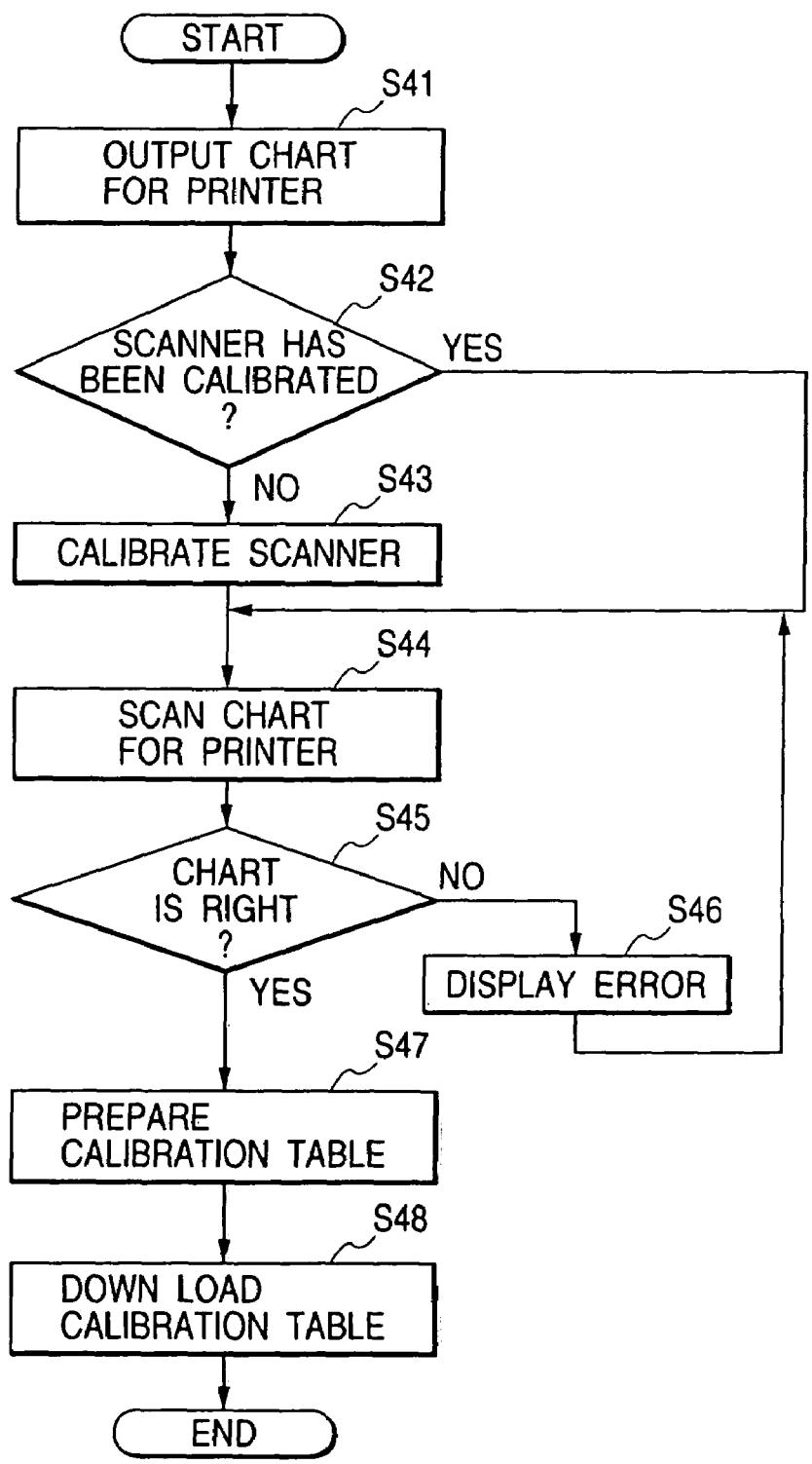
FIG. 4 is a flow chart showing the process flow of printer calibration.

Referring to FIG. 4, a step S42 discriminates whether the scanner apparatus 3 of the present system is already calibrated. This discrimination can be achieved by judging whether a luminance-density conversion table to be explained later, namely scanner calibration data, is stored in the scanner calibration data storage unit 11 in the server PC 1. If the scanner calibration is already executed, the sequence proceeds to a step S44, but, if not yet executed, the sequence proceeds to a step S43 for executing the scanner calibration.

Figure 12:
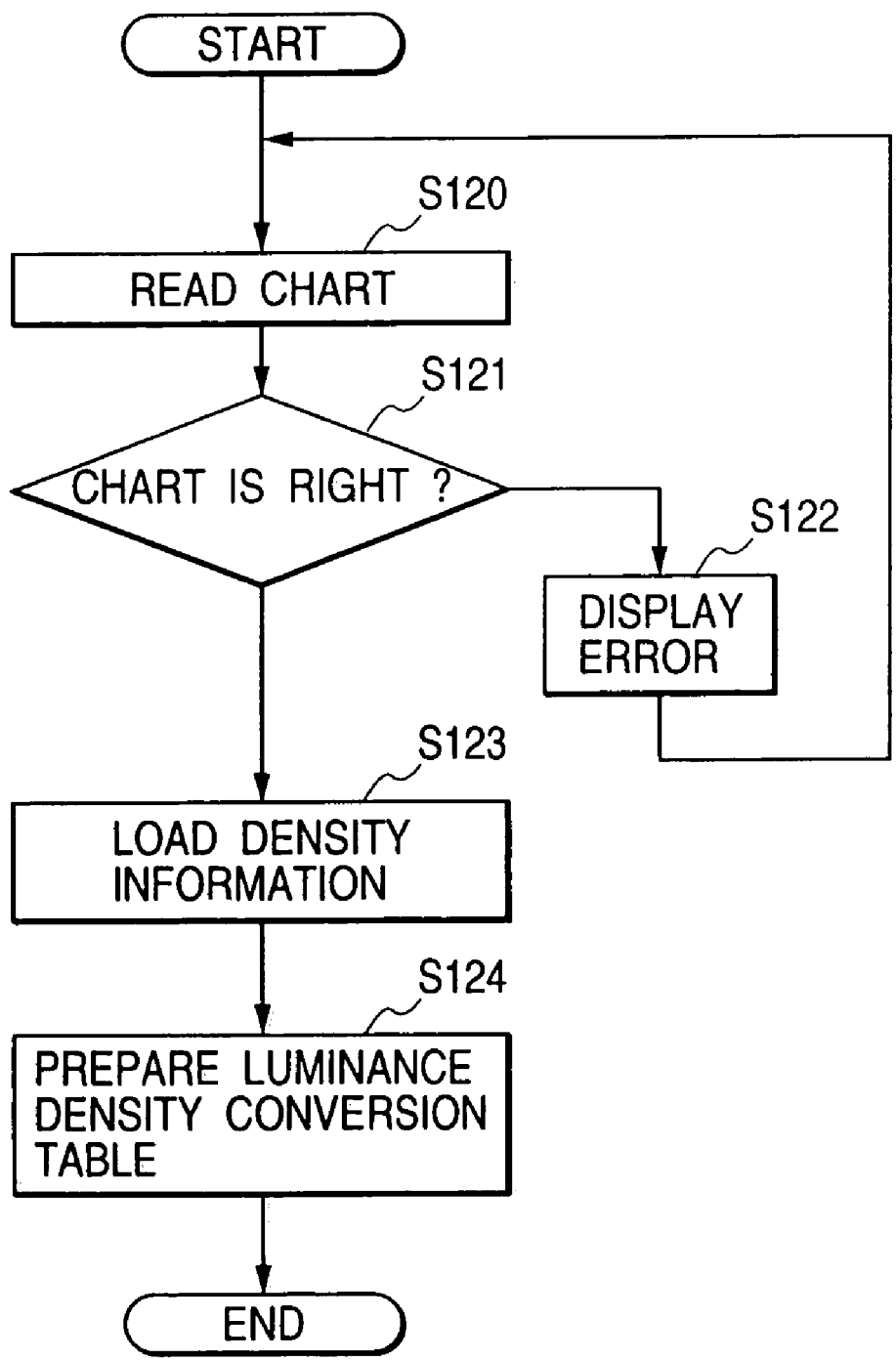
FIG. 12 is a flow chart showing the flow of scanner calibration in a first embodiment.

The flow of scanner calibration will be explained with reference to FIG. 12. In FIG. 12, a step S120 at first executes reading of a scanner chart, which is similar to the aforementioned printer chart showing in FIG. 6 but is different in the purpose.

Figure 15:
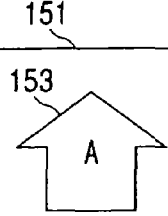
FIG. 15 is a view showing an example of the scanner chart to be used in the printer calibration system.

FIG. 15 shows an example of the scanner chart. In FIG. 15, an entire scanner chart is shown by a frame 151 of A4 size. A data portion 152 consists, as in the example shown in FIG. 6, of 1024 blocks in total, composed of 32 divisions in the vertical and lateral directions.

Discrimination information 153 is provided for the discrimination to be explained in the following. The discrimination information is shaped as an arrow for indicating the direction of the chart when it is placed on the original supporting table of the scanner apparatus as in the case of FIG. 6, but contains therein a letter "A" for causing the user to identify this chart as a scanner chart. The arrow constituting the discrimination information in the printer chart shown in FIG. 6 is colored with a certain solid color (for example cyan color), while the arrow constituting the discrimination information in the scanner chart shown in FIG. 15 is colored with another solid color (for example magenta color) and is used for the discrimination to be explained later. Registration marks 154, 155 shown in FIG. 15 will also be explained later.

The above-described scanner sheet is a reference sheet, printed in advance for example by offset printing, and is therefore different from the printer chart outputted from the printer in the aforementioned step S41.

Consequently the scanner chart need not to assume the format shown in FIG. 6, but such format will be taken as an example in the present embodiment. In such case, the printer chart shown in FIG. 5 and the scanner chart shown in FIG. 15 look similar, and may cause misuse by the user.

A step S121 discriminates whether a proper chart is used. As the scanner calibration is intended in this case, there is discriminated whether the chart is the scanner chart A.

Figure 18:
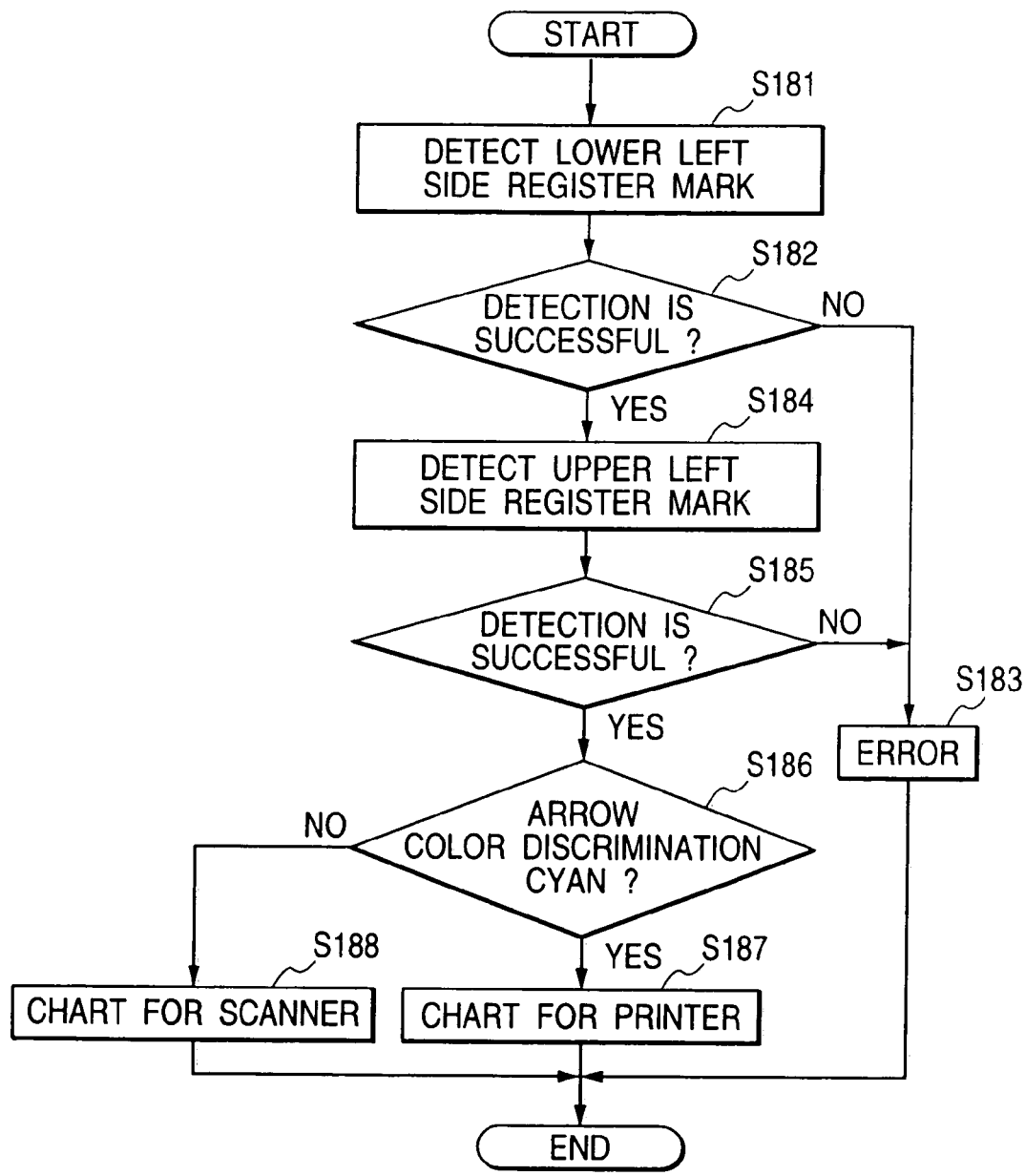
FIG. 18 is a flow chart showing the process flow of chart detection in the first embodiment.

The flow of such discrimination will be explained with reference to FIG. 18. A step S181 executes detection of the lower left registration mark 155. Since the size of the chart is determined in advance, the number of pixels between the data constituting the chart can be uniquely determined by fixing the scanning resolution of the scanner apparatus. The discrimination process shown in FIG. 18 is executed after the step S120 in FIG. 12 stores the data of the chart of A4 size in a memory.

The detection of the lower left registration mark 155 is executed by searching a black (non-white) area of a pixel number corresponding to such registration mark, within an area predetermined from the lower left corner of the A4 sized-area. If a step S182 identifies a failure in detection of the lower left registration mark, a step S183 returns an error signal. If a registration mark detection error signal is returned in this discrimination step, a step S122 in FIG. 12 executes an error display. An example of such error display is shown by an error window 173 in FIG. 17. The error window 173 is displayed on the personal computer. The displayed error message instructs the user to repeat the reading operation after confirmation of the position of the chart to be measured and the reading resolution, and the chart reading is executed again in the step S120.

Figure 17:
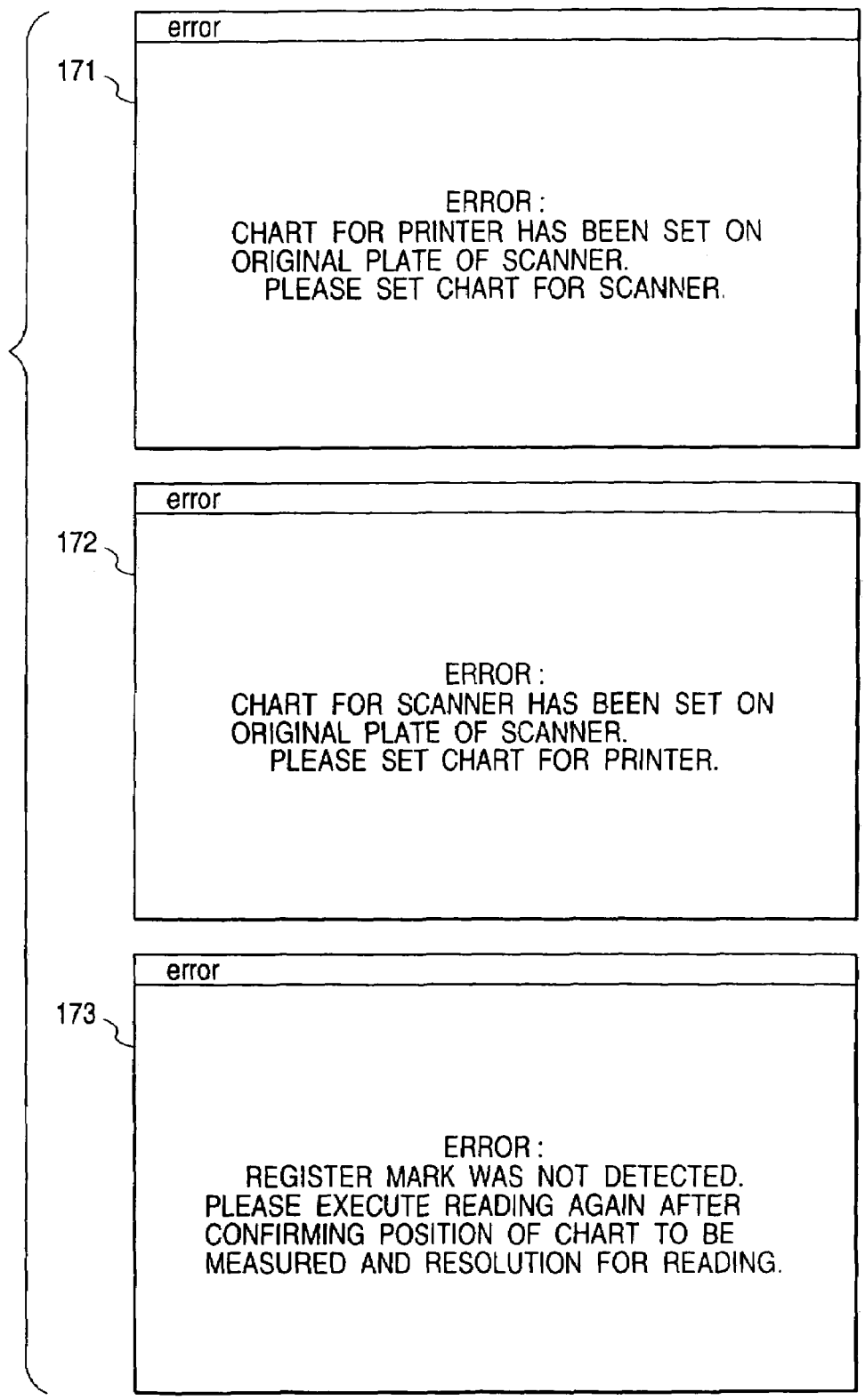
FIG. 17 is a view showing an example of error display in a second embodiment.

If step S181 succeeds in detecting the lower left registration mark, a step S184 executes detection of the upper left registration mark. The detection of the upper left registration mark 154 is executed by searching, within the memory, a black (non-white) area of a pixel number corresponding to such upper left registration mark, within a predetermined area separated upwards by a predetermined pixel number from the lower left registration mark. If a step S185 identifies a failure in detecting the upper left registration mark, a step S183 returns an error signal whereby the error display 173 shown in FIG. 17 is executed as in the aforementioned flow.

If a step S184 succeeds in detecting the upper left registration mark, a step S186 discriminates the color of the arrow constituting the discrimination information 153 in FIG. 15. The arrow 153 is provided in a position in the memory separated by a predetermined pixel number to the right from the aforementioned upper left registration mark. The color is discriminated by referring to the RGB signal of the pixels in such position. More specifically, the cyan color can be identified by discriminating whether the RGB signals respectively assume values 0, 255, 255. In practice, in consideration of the fluctuation of characteristics of the scanner and of eventual smear of the chart, several pixels within the arrow mark are sampled and averaged, and there is discriminated whether the RGB values are respectively within a range around 0, 255, 255. If the step S186 identifies the cyan color, a step S187 identifies the printer chart, whereupon the discrimination step is terminated.

If the step S186 does not identify the cyan color, a step S188 identifies a scanner chart, whereupon the discrimination step is terminated.

If the aforementioned discrimination identifies the printer chart, a step S121 discriminates that the chart is not correct, and a step S122 executes an error display. FIG. 17 shows an example 171 of such error display, which is an error window display on a personal computer. After such error message requests that the user is to replace the scanner chart on the original supporting table of the scanner, the reading of the chart is executed again in the step S120. The chart discrimination explained above avoids the misuse of the scanner chart and the printer chart by the user.

A step S123 loads density data, obtained by measuring in advance the above-mentioned scanner chart with a densitometer or the like. Such density data are stored in advance in the server PC 1. Thus the scanner chart and the density data are correlated comprehensively and the scanner calibration to be explained in the following is executed, based on such correlation. A step S124 prepares a luminance-density conversion table, based on the relationship between the RGB scanner signals read in the step S120 and the CMYK density information loaded in the step S123. Such step constitutes the scanner calibration.

The above-mentioned table is prepared for each of CMYK colors. The table is so constructed, for a scanner input value x for a block within the aforementioned scanner patch data, as to output an output y indicating the actual density of such block and obtained from the above-mentioned density data. It is thus rendered possible to obtain a comprehensive luminance-density converting relationship by repeating the scanner calibration in case the input characteristics of the scanner vary or for a different kind of scanner.

In the present embodiment, for measuring the patch density, the R data generated in the scanner are used for measuring the C patch density, while the G data are used for measuring the M patch density, the B data are used for measuring the Y patch density, and the G data are used for measuring the K patch density. Thus, the luminance-density conversion table is prepared for each of CMYK colors, based on the RGB luminance data corresponding to the CMYK patches and the density information loaded in the step S123.

The scanning operation is executed by a scanner driver constituted usually on the PC 1. Such scanner driver executes setting of the scanning resolution and designation of the input area.

Then a step S44 in FIG. 4 executes measurement of the aforementioned printer chart by the scanner 3.

The scanner 3 receives the RGB values of the blocks of the aforementioned patch data and sends such values to the PC 1. Based on such input signals and the block arrangement of the aforementioned patch data, the PC 1 calculates the averages of four positions at the highlight side and those of eight positions at the shadow side, thereby obtaining RGB signals of 48 gradation levels for each of CMYK colors. Then, based on the aforementioned luminance-density conversion tables prepared in advance by the aforementioned scanner calibration and showing the correspondence between the RGB luminance signals of the scanner 3 and the CMYK density signals of the printer 2, the density characteristic values of 48 gradation levels are obtained from the luminance signals of 48 gradation levels.

Then, as in the aforementioned scanner calibration, a step S45 discriminates whether the chart used is a proper chart. As the scanner calibration is intended in this case, there is discriminated whether the chart is the printer chart B. The flow of such discrimination is as explained in the foregoing with reference to FIG. 18, and is executed after a step S44 stores the data of the chart of A4 size in the memory. More specifically, a step S181 in FIG. 18 detects the lower left registration mark, and a step S184 detects the upper left registration mark. In case of failure in detecting these registration marks, a step S46 executes an error display 173. The displayed error message instructs the user to repeat the reading operation after confirmation of the position of the chart to be measured and the reading resolution, and the chart reading is executed again in the step S44.

A step S186 discriminates the color of the arrow constituting the discrimination information 63 in FIG. 6. If the step S186 identifies the cyan color, a step S187 identifies the printer chart, whereupon the discrimination step is terminated. If the step S186 does not identify the cyan color, a step S188 identifies a scanner chart, whereupon the discrimination step is terminated.

If the aforementioned discrimination of the step S45 identifies the scanner chart, there is discrimination that the chart is not correct, and a step S46 executes an error display. FIG. 17 shows an example 172 of such error display, which is an error window display on a personal computer. After such error message requests that the user is to replace the printer chart on the original supporting table of the scanner, the reading of the chart is executed again in the step S44. The chart discrimination explained above avoids the misuse of the scanner chart and the printer chart by the user.

Figure 5A:
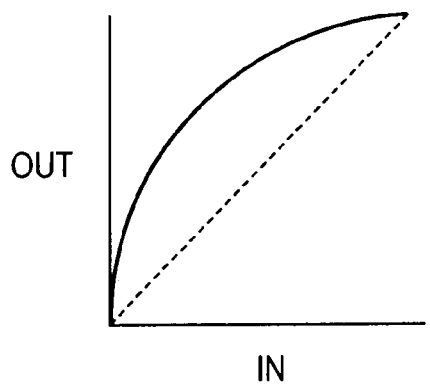
FIGS. 5A, 5B and 5C are charts showing the concept of calibration data preparation.
Figure 5B:
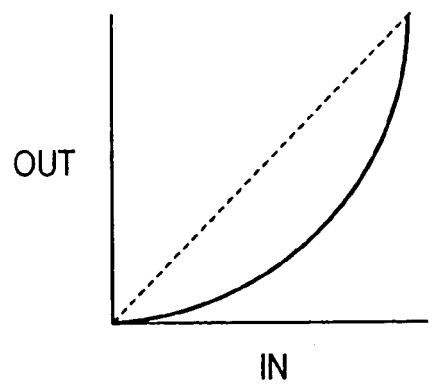
Figure 5C:
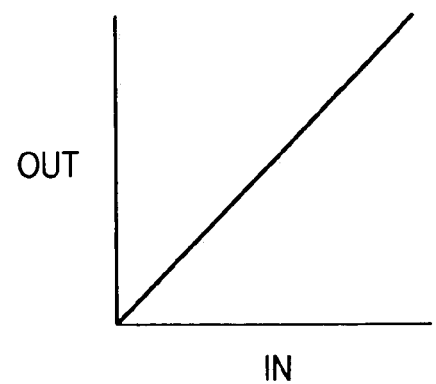

Then a step S47 executes preparation of a calibration table in the server PC 1. The mode of preparation will be explained with reference to FIGS. 5A to 5C. FIG. 5A shows the density characteristic values of 48 gradation levels of each color. Though only one color is shown for the purpose of simplicity, similar processes are executed in practice for the CMYK colors. FIGS. 5A to 5C show curves indicating the relationships between input and output, to be determined by interpolating calculation from the aforementioned 48 gradation levels. The ideal density characteristics are defined as a linear curve as shown in FIG. 5C. Therefore, for bringing the current density characteristics shown in FIG. 5A to the ideal density shown in FIG. 5C, a calibration table shown in FIG. 5B is determined by an inverse function. Thus, the characteristics in FIG. 5C are obtained by applying the characteristics in FIG. 5B to the characteristics shown in FIG. 5A.

Then a step S44 causes the server PC 1 to execute the downloading of the calibration table data to the printer 2 through the network.

In this operation, as in the aforementioned case of chart output, the object printer is specified, assuming that plural printers are connected on the network. The downloaded calibration data are stored in the calibration data storage unit 21. The download command in this operation depends on the command system of the printer 2 but will not be explained further herein.

Figure 7:
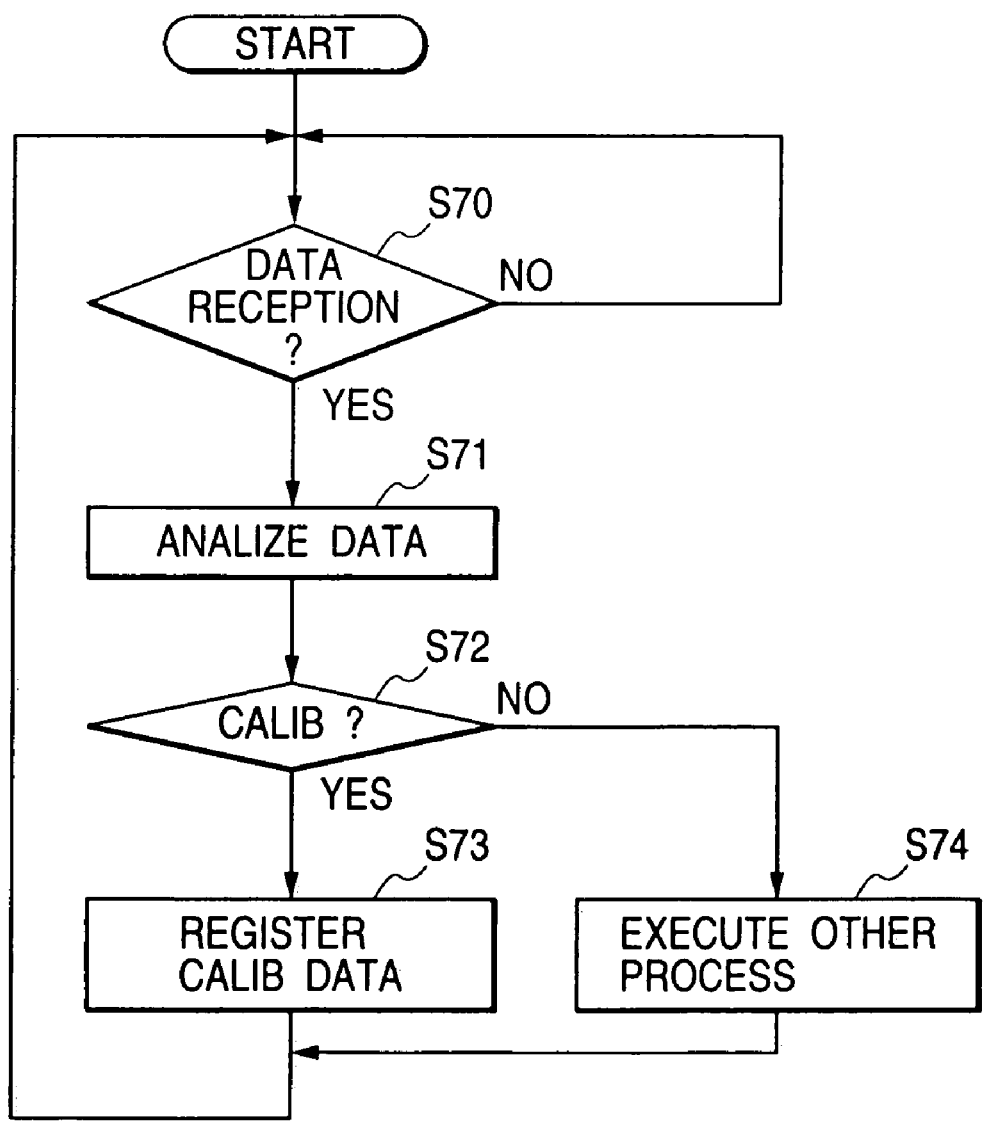
FIG. 7 is a flow chart showing the process flow in receiving a calibration data download command in the printer apparatus.

Now there will be explained, with reference to FIG. 7, the process flow in receiving the downloaded data by the printer 2. A step S70 in FIG. 7 discriminates whether data have been received. If not received, the step S70 is repeated. If received, a step S71 executes data analysis. A step S72 discriminates the result of such analysis, and if it is a calibration data download command, a step S73 stores the calibration data in the calibration data storage unit 21. If the step S72 identifies that the result is not the calibration data download command, a step S74 executes a process matching the data.

Figure 11:
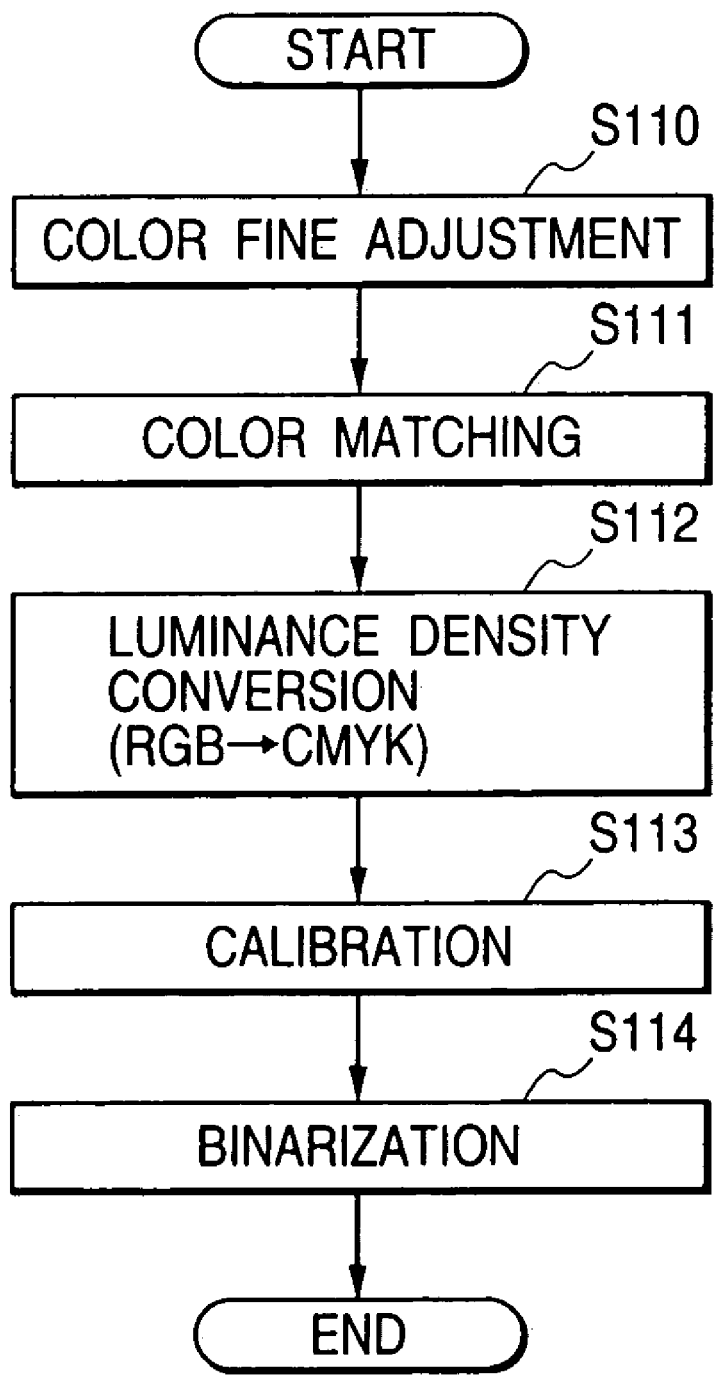
FIG. 11 is a flow chart showing the flow of image processing in a printer.

The ordinary print data are transferred from an application on the PC 1 through a printer driver thereon to the printer 2. In the step S74 etc. in FIG. 7, the printer 2 executes analysis of print data, page layout constitution, image processing, printing etc. In the following there will be explained, with reference to FIG. 11, the process flow of image processing with the calibration data in the printer 2. At first a step S110 executes fine color adjustment on the RGB input signals, consisting of luminance correction and contrast correction. Then a step S111 executes color matching, for matching the hue of the monitor with that of the print. Then a step S112 executes luminance-density conversion, for converting the input RGB luminance signals into the CMYK density signals which are print signals for the printer. Then a step S113 executes a calibration process for obtaining linear output characteristics for the CMYK signals of 8 bits each, utilizing the aforementioned calibration data. Then a step S114 converts the CMYK signals of 8 bits each, into signals matching the output system. In general there is executed binarization input YMCK signals of one bit each.

In the following there will be explained, with reference to FIGS. 8 and 9, the flow of a user interface (UI) of a printer constituting system in the PC 1. This printer constituting system is constituted as an application on the server PC 1.

Figure 9:
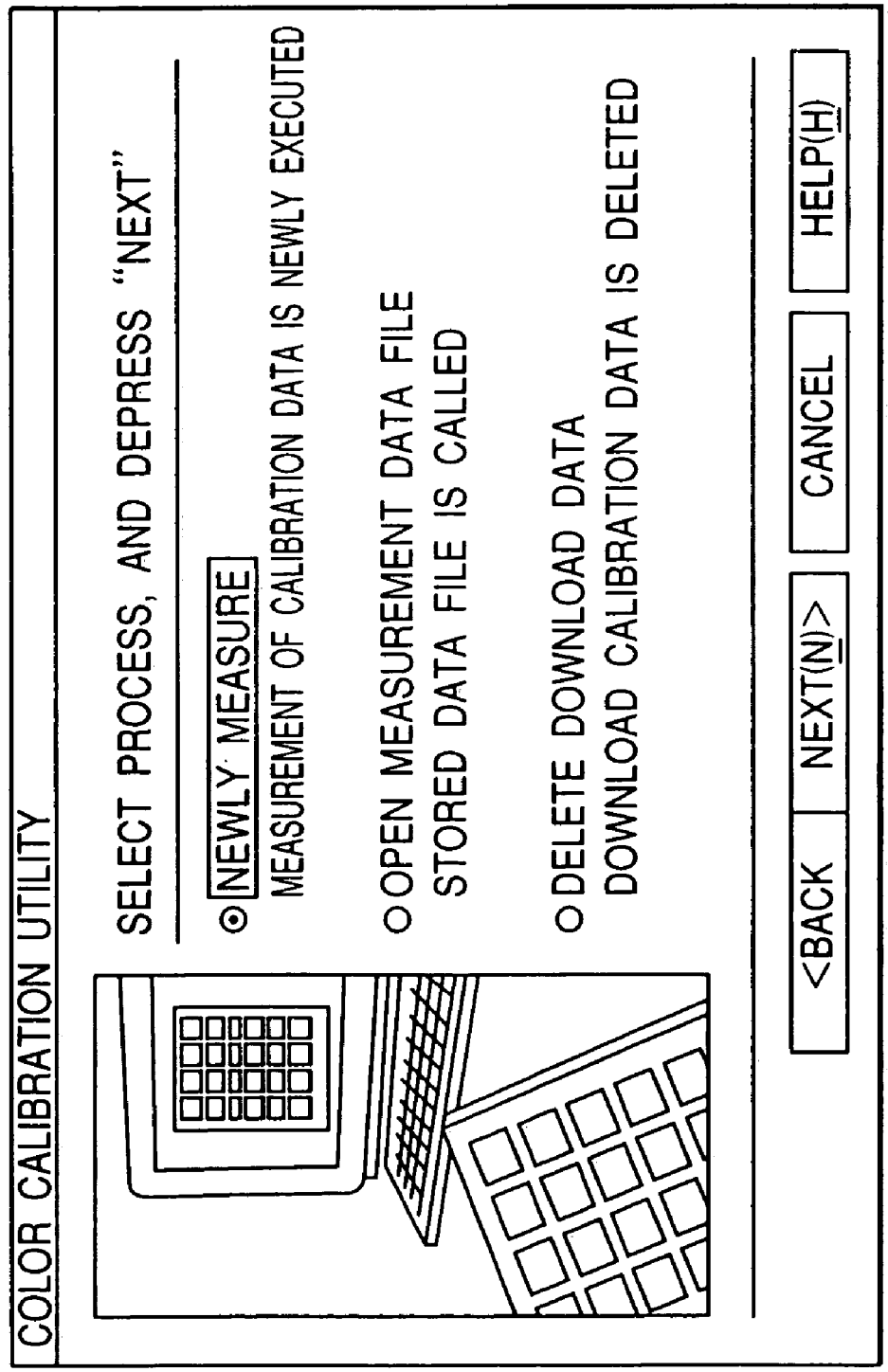
FIG. 9 is a view showing an example of U1 in an application.

At first a step S81 displays a main image, of which an example is shown in FIG. 9. The image shown in FIG. 9 and other images are basically so constructed that the display shifts to other related images by depressing buttons "next", "return", "cancel" and "help". In the main image shown in FIG. 9, there are provided three menu selections "new", "open existing measurement data" and "delete download data". If "new" is selected and "next" is depressed, the sequence proceeds to a step S82 for outputting the chart data to the printer 2. Then a step S85 executes calibration of the scanner 3 by the PC 1 as explained in the foregoing, and prepares the luminance-density conversion table specific to the scanner 3. Then a step S87 executes measurement of the chart in the scanner 3 utilizing the aforementioned luminance-density conversion table, as explained in the foregoing. A next step S88 applies calibration. This step executes the step S43, S44 in FIG. 4, namely preparation of the calibration data and downloading of the data to the printer 2. In a next step S88, there is provided a button for shifting to a step S89, and a shift thereto is realized by the depression of such button by the user. A step S89 enables storage of the measurement data, and is used for storing the scan data measured in the step S87. Thus stored file can be used in a process flow utilizing the existing measurement data as will be explained later. After the step S89, the sequence returns to the step S88. Then a step S810 displays a processing ending image, and the process is terminated if the end of application is designated on such image, but the sequence returns to the step S81 if returning to the main image is designated.

If "open measurement data" is selected and "next" is depressed in the main image of the step S81, there is displayed an image of the step S83 for designating the measurement data. By depressing a "reference" button, the display shifts to an image of the step S86 for reading the measurement data, thereby enabling detailed search of the measurement data. The measurement data are the data file stored in the foregoing step S89. Then the photoelectric conversion 88 applies the calibration. The flow thereafter is same as that explained in the foregoing.

If "delete download data" is selected and "next" is depressed in the main image of the step S81, a step S84 deletes the calibration data stored in the calibration data storage unit 21. This operation is executed by a command from the PC 1 to the printer 2, but the command is not explained further.

Then the sequence proceeds to the ending image of the step S810, and the subsequent flow is same as explained in the foregoing.

Figure 8:
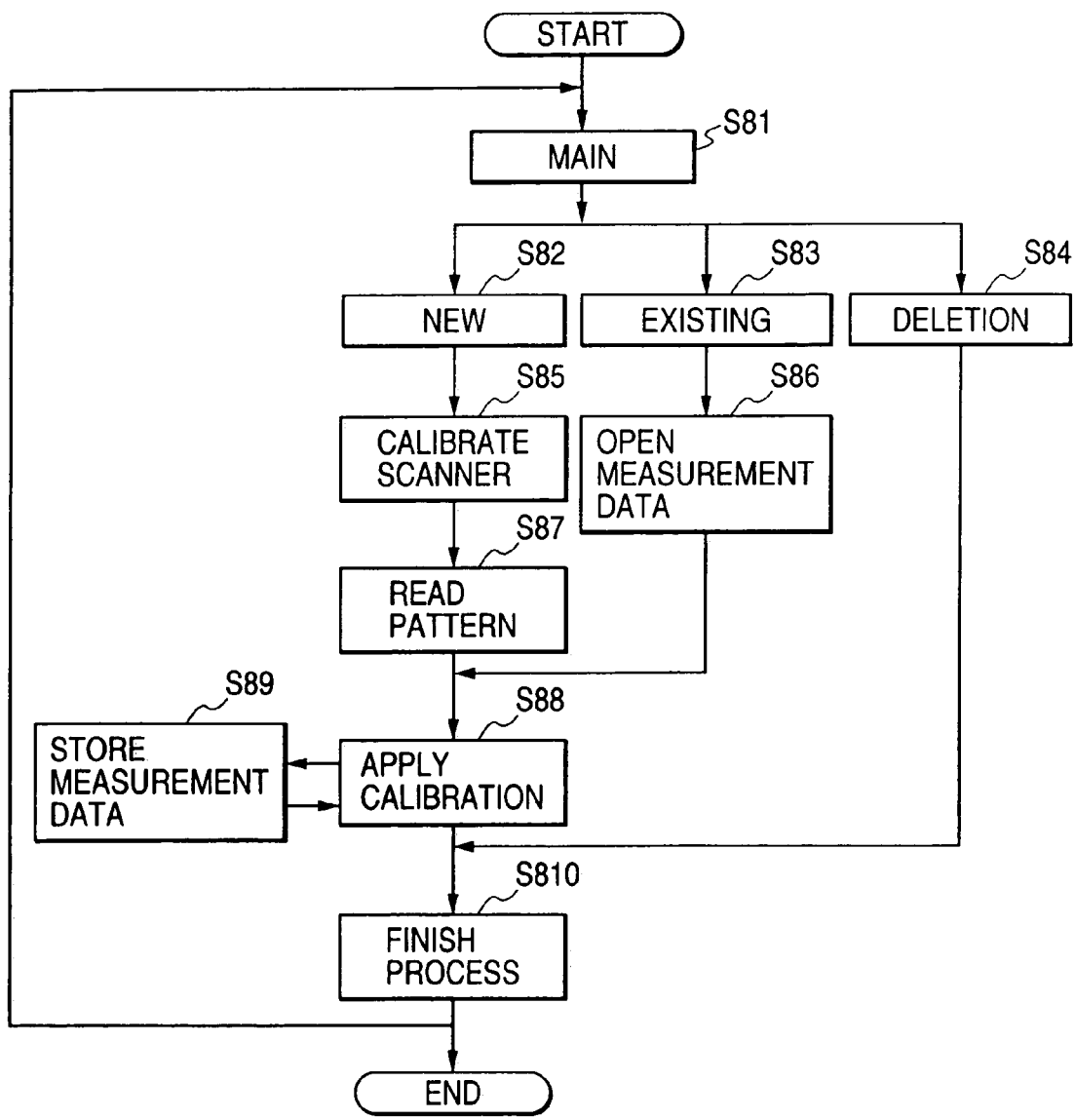
FIG. 8 is a flow chart showing the flow of U1 in an application.

In the present embodiment, as explained in the foregoing, it is necessary to specify the object printer, assuming that plural printers are connected on the network, and such operation is executed on the U1 at the printing of the printer chart in the step S82 in FIG. 8. The application executes instruction for chart output and downloading of the calibration data to the designated printer.

In the foregoing there has been explained, with reference to FIGS. 8 and 9, the flow of the user interface (U1) of the printer calibration system functioning as an application on the PC 1.

As explained in the foregoing, the present embodiment allows to constantly execute color printing in stable manner.

It is also possible to improve the convenience of use of the calibration process for the scanner and for the printer. In particular, it is possible to prevent erroneous use of the charts.

The characters provided for identifying the charts in the arrow-shaped mark thereof may naturally be replaced by other characters or words.

Second Embodiment

In the following there will be given a detailed explanation of a second embodiment of the present invention.

In contrast to the first embodiment designed to execute automatic discrimination and to provide error display in case the scanner chart and the printer chart to be used in the calibration are erroneously used by an operation error of the user, the second embodiment is so designed as to detect an inverse placement of the two charts on the original supporting table of the scanner by an operation error of the user and to execute a process same as in the case where the charts are properly placed.

Consequently, the printer calibration apparatus of the second embodiment is same in the basic configuration as the first embodiment, but is different in detecting the inverse placement of the two charts on the original supporting table of the scanner and executing data processing in a same manner as in the case of proper placement, and also in the control method thereof.

In the following there will be explained portions different from the first embodiment.

The configuration of the printer calibration system of the second embodiment is similar to that of the foregoing first embodiment shown in FIG. 1.

Figure 2A:
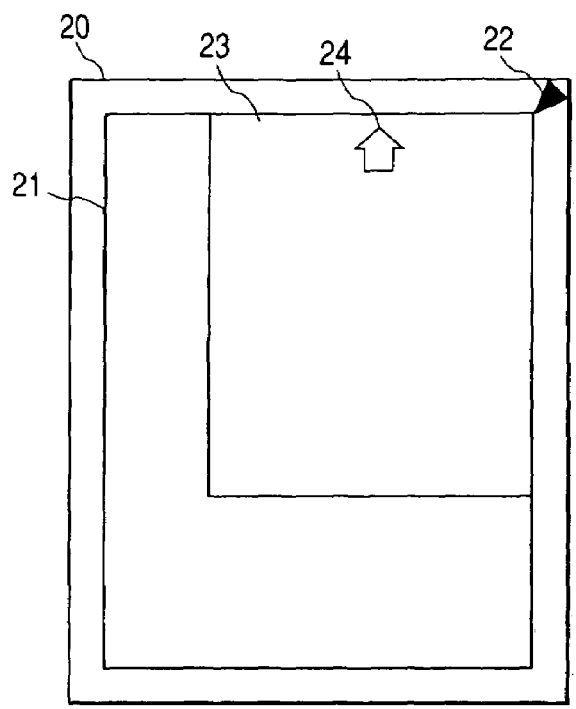
FIGS. 2A and 2B are views showing an example of inverted placement of a printer calibration system of a second embodiment.
Figure 2B:
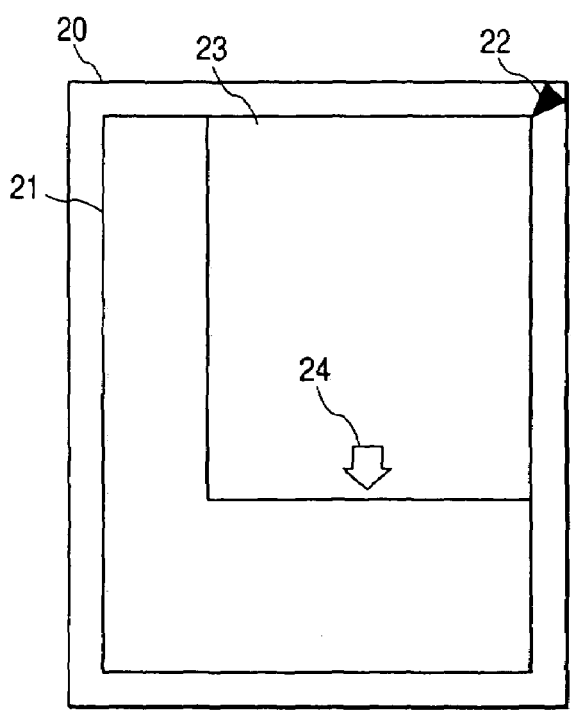

In the following there will be explained, with reference to FIGS. 2A and 2B, a case where the chart is placed in a vertically inverted position on the original supporting table of the scanner. In FIG. 2A, there are shown a scanner apparatus 20 corresponding to the scanner 3, an original supporting table 21, an original point 22 for aligning the original, usually provided in the ordinary scanner apparatus, and a chart 23 which can be a scanner chart A of the form shown in FIG. 15 or a printer chart B of the form shown in FIG. 6. In the present embodiment these two charts are processed in the same manner, so that the following description will be made, as an example, on the printer chart B shown in FIG. 6. There is also shown discrimination data 24 which corresponds to the arrow mark 63. In FIG. 6, there are also shown a lower left registration mark 64, an upper left registration mark 65 and an upper right registration mark 66 which are used for discrimination whether the sheet is placed in a vertically inverted position, as will be explained later.

FIG. 2A shows a state in which the chart is properly placed on the original supporting table, and the data processing is executed assuming that the chart is placed in such state in which the arrow-shaped mark 24 is positioned upward. However the user may place the chart in an inverted state as shown in FIG. 2B. In such case, it is possible to draw the attention of the user for example by displaying a registration mark detection error as in the foregoing first embodiment, but, if the chart is in a completely inverted state, the process can be continued by internally rearranging the format and the present embodiment is to realize such configuration.

Now the process flow of the second embodiment will be explained with reference to FIGS. 13 and 14.

As explained in the foregoing, the present embodiment relates to a process in scanning the chart with the scanner, and such process is executed in reading the printer chart in the step S44 in FIG. 4 and in reading the scanner chart in the step S120 in FIG. 12. Thus, as in the discrimination process in the first embodiment, this process is executed after the data of the chart of A4 size are once stored in the memory.

Figure 13:
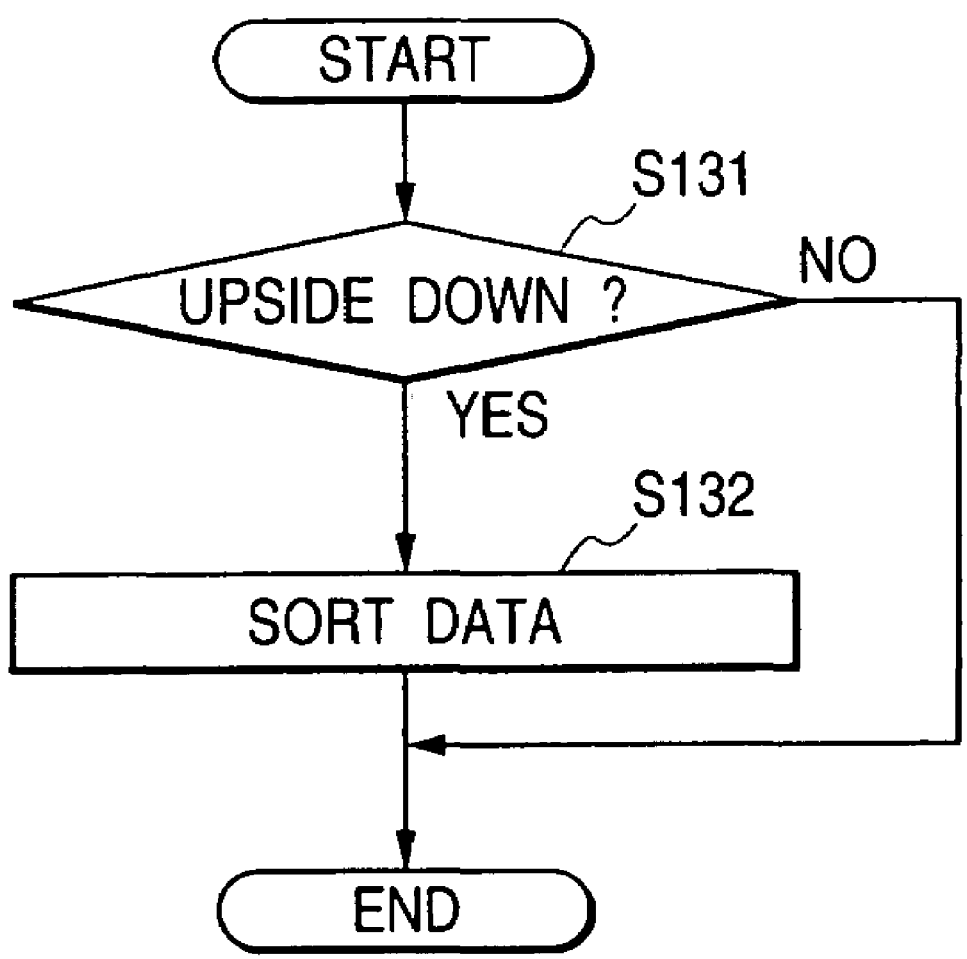
FIG. 13 is a flow chart showing the process flow in a second embodiment.
Figure 14:
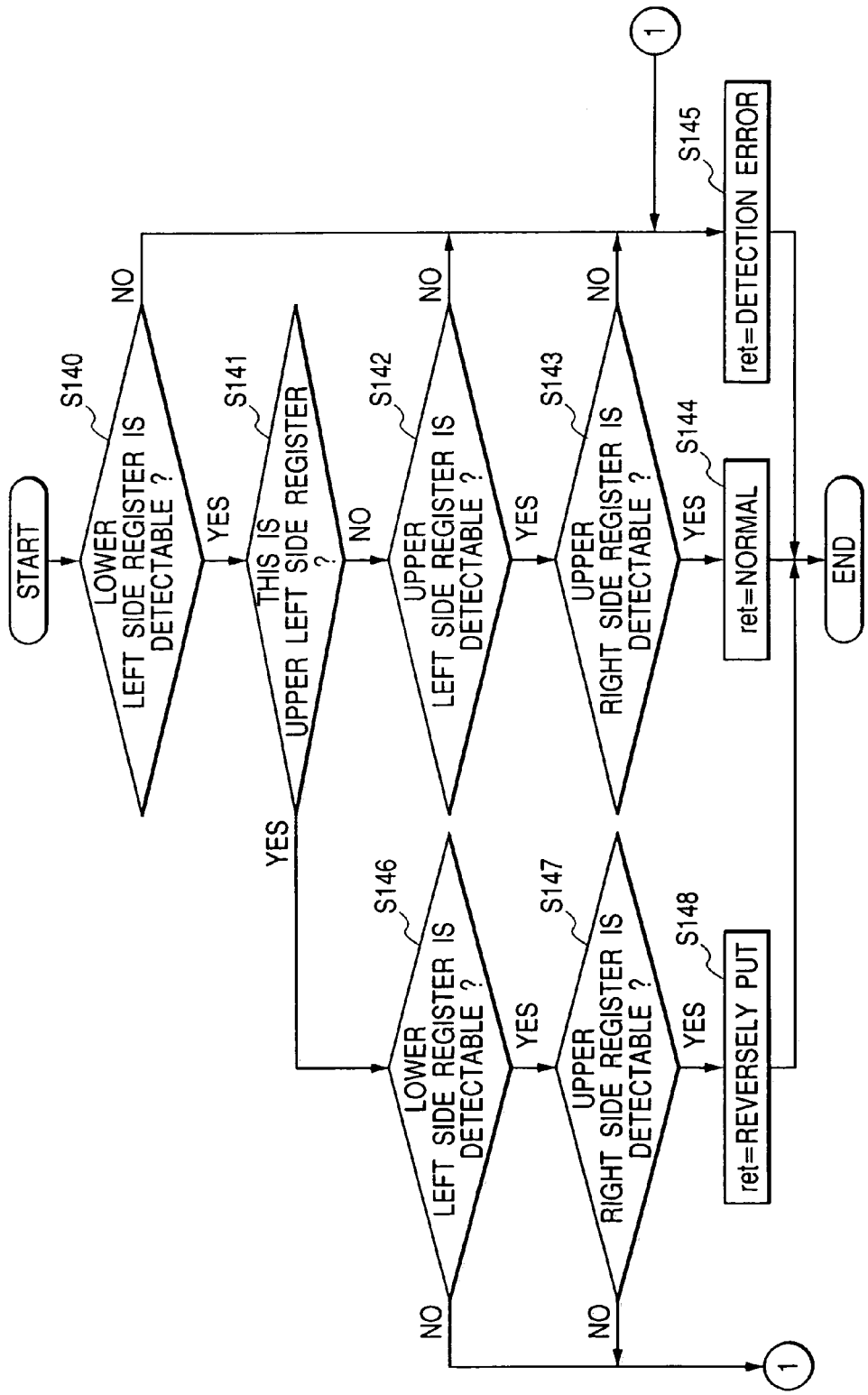
FIG. 14 is a flow chart showing the process flow for detecting inverse placement in the second embodiment.

Referring to FIG. 13, a step S130 discriminates whether the chart is placed in the inverted position. The flow of the discrimination process will be explained with reference to FIG. 14, taking the printer chart B shown in FIG. 6 as an example. Referring to FIG. 14, a step S140 detects the lower left registration mark 65. Since the size of the chart is determined in advance, the number of pixels between the data constituting the chart can be uniquely determined by fixing the scanning resolution of the scanner apparatus. The detection of the lower left registration mark 65 is executed by searching, in the memory storing the read chart data, a black (non-white) area of a pixel number corresponding to such registration mark, within an area predetermined from the lower left corner of the A4 sized-area. If there is identified a failure in detecting the lower left registration mark in the step S140, a step S145 returns an error signal. If a registration mark detection error signal is returned in this discrimination step, an error display is executed in an upper layer but such error display will not be shown. The content of the error message is the registration detection error 173 shown in FIG. 17.

If step S140 succeeds in detecting the registration mark, a step S141 checks the possibility of inverted placement. More specifically there is detected whether the registration mark detected in the step S140 is the upper left registration mark placed in an inverted position. This detection is achieved by the difference in the shapes of the upper left and lower left registration marks 64, 65 shown in FIG. 6.

If the step S141 judges that the detected registration mark is not the upper left registration mark, steps S142 and S143 execute detection of the upper left and upper right registration marks. In case of proper detection, a step S144 returns a signal indicating the normal state. In case of an error in the step S142 or S143, the step S145 returns an error signal as explained in the foregoing.

If the registration mark detected in the step S141 is judged as the upper left registration mark, the chart is possibly placed in the inverted position. In such case a step S146 executes detection of the lower left registration mark, and, in case of detection, a step S147 executes detection of the upper right registration mark. If all these registration marks are detected, a step S148 returns a signal indicating that the chart is placed in the inverted position. In case of an error in the step S147 or S148, the step S145 returns an error signal as explained in the foregoing.

If the step S130 in FIG. 13 judges the inverted placement of the chart, a step S131 rearranges the data in the memory storing the read chart data. Such rearrangement is executed in such a manner that the data at the upper left corner (arrangement 1, 1) in FIG. 6 come to the lower right corner position (arrangement 32, 32). In such case, it is naturally possible also, instead of actually rearranging the data, to turn on a flat indicating the inverted placement for example in the step S131, and to refer to such flag in the memory access in a subsequent step and to execute the memory access in consideration of such flag in case of the inverse placement.

As explained in the foregoing, the second embodiment provides a method of detecting the vertically inverted placement of the chart on the original supporting table of the scanner and allowing to continue the process as in the case of normal placement, whereby the inverted placement of the chart is not processed simply as an error but the process can be continued in the same manner as in the case of normal placement by interval data rearrangement thereby realizing calibration of improved convenience of use.

Third Embodiment

In the following there will be given a detailed explanation on a third embodiment of the present invention.

In contrast to the first embodiment designed to execute automatic discrimination and to provide error display in case the scanner chart and the printer chart to be used in the calibration are erroneously used by an operation error of the user, the third embodiment is so designed as to detect a skewed placement of the two charts on the original supporting table of the scanner by an operation error of the user and to execute an error display.

Consequently, the printer calibration apparatus of the third embodiment is same in the basic configuration as the first embodiment, but is different in detecting the skewed placement of the two charts on the original supporting table of the scanner and executing an error display, and also in the control method therefor.

In the following there will be explained portions different from the first embodiment.

The configuration of the printer calibration system of the third embodiment is similar to that of the foregoing first embodiment shown in FIG. 1.

Figure 3:
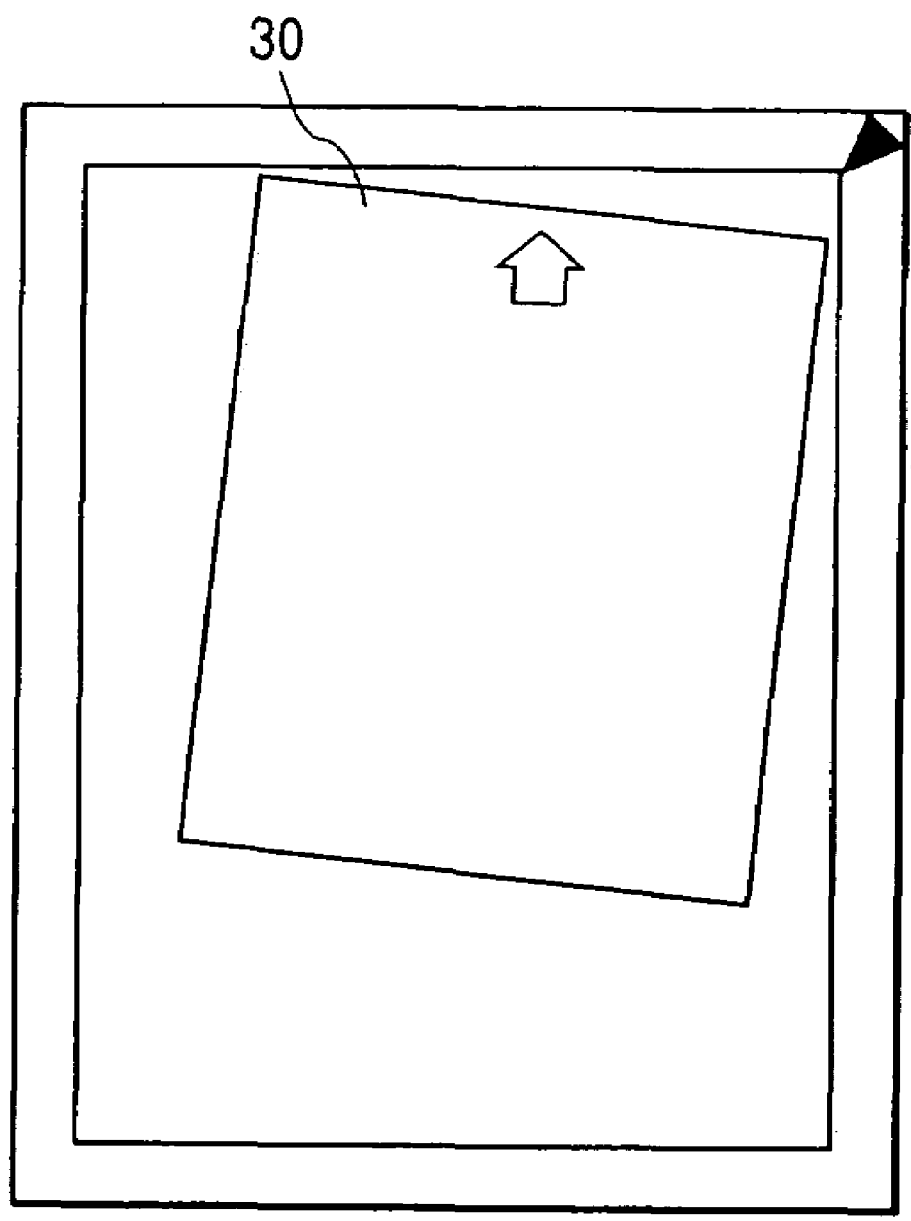
FIG. 3 is a view showing an example of skew of a printer calibration system of a third embodiment.

In the following there will be explained, with reference to FIG. 3, a case where the chart is placed in a skewed position on the original supporting table of the scanner. In FIG. 3 there is shown a chart 30 which is placed in a skewed position, different from the normal state shown in FIG. 2A, with respect to the original supporting table. Such skewed state cannot ensure the proper reading of the information of the chart. For example, if the reading of A4 size is instructed to the scanner, the chart in such skewed state may overflow from the frame of A4 size.

In such case it is necessary to indicate the operation error to the user and request that the user places the chart in the proper position.

In the present embodiment the scanner chart A and the printer chart B are processed in the same manner, so that the following description will be made, as an example, on the printer chart B shown in FIG. 6. There is also shown discrimination data 24 which corresponds to the arrow mark 63. In FIG. 6 there are also shown a lower left registration mark 64, an upper left registration mark 65 and an upper right registration mark 66 which are used for discrimination whether the sheet is in a skewed position, as will be explained later.

Now the process flow of the third embodiment will be explained with reference to FIG. 19.

As explained in the foregoing, the present embodiment relates to a process in scanning the chart with the scanner, and such process is executed in reading the printer chart in the step S44 in FIG. 4 and in reading the scanner chart in the step S120 in FIG. 12. Thus, as in the discrimination process in the first embodiment, this process is executed after the data of the chart of A4 size are once stored in the memory.

Figure 19:
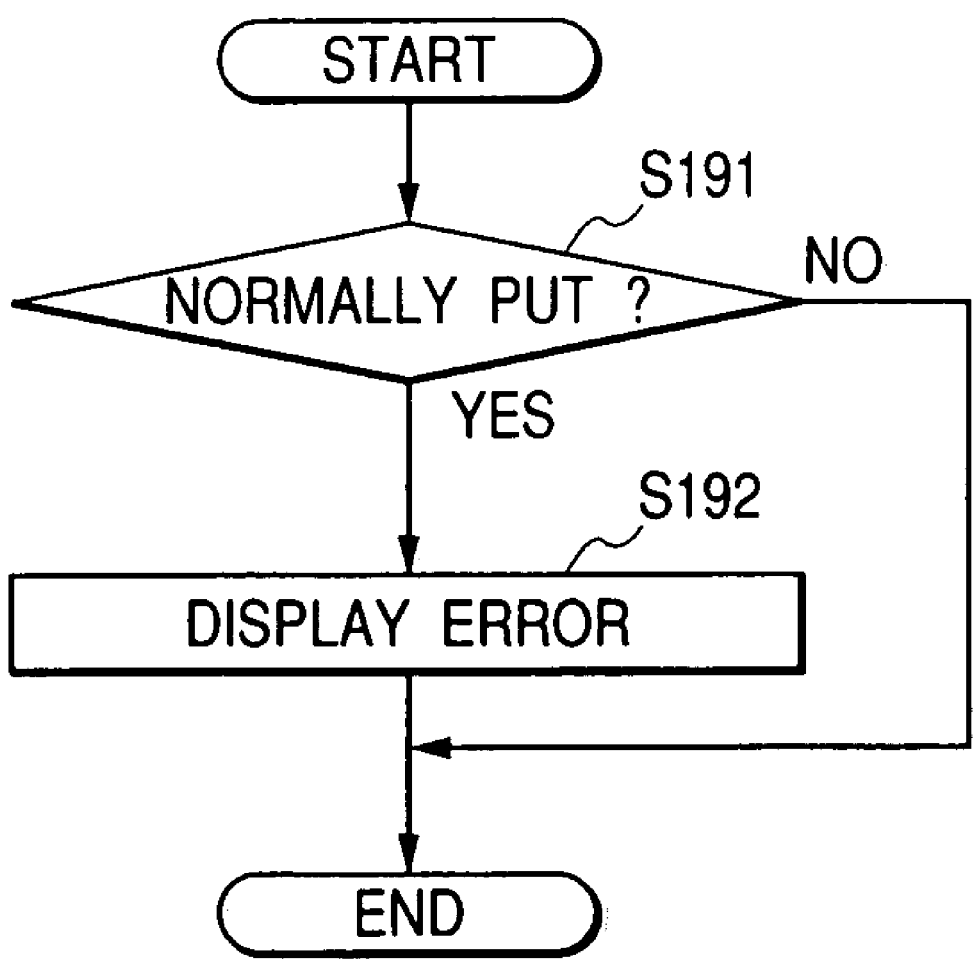
FIG. 19 is a flow chart showing the process flow in the third embodiment.
Figure 20:
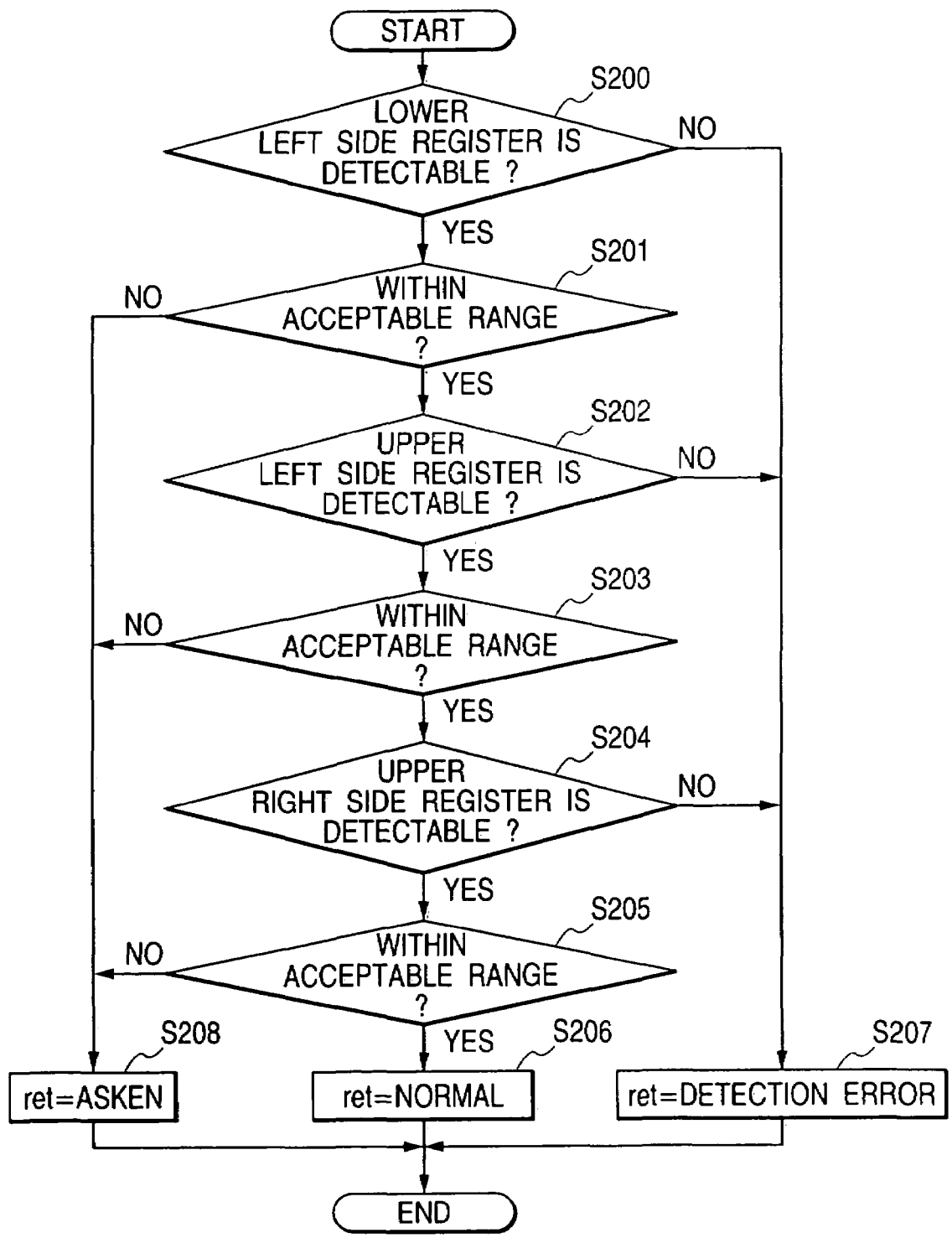
FIG. 20 is a flow chart showing the flow of a screw detection process in the third embodiment.

Referring to FIG. 19, a step S191 discriminates whether the chart is placed in the normal position. The flow of the discrimination process will be explained with reference to FIG. 20, taking the printer chart B shown in FIG. 6 as an example. Referring to FIG. 20, a step S200 detects the lower left registration mark 65. Since the size of the chart is determined in advance, the number of pixels between the data constituting the chart can be uniquely determined by fixing the scanning resolution of the scanner apparatus. The detection of the lower left registration mark 65 is executed by searching, in the memory storing the read chart data, a black (non-white) area of a pixel number corresponding to such registration mark, within an area predetermined from the lower left corner of the A4-sized area. If there is identified a failure in detecting the lower left registration mark in the step S200, a step S207 returns a registration mark detection error signal. If the step S200 succeeds in detecting the registration mark, a step S201 checks whether the position of the registration mark is within the range of allowance. In case of skewed placement, the position of the registration mark is displaced, and there is confirmed whether the amount of such displacement is accommodated within a range of allowance defining the skewed position.

Such range of allowance is not explained further but is determined empirically. If the step S201 identifies that the amount of displacement is outside the allowance range, a step S208 returns a skew error signal.

If the step S201 identifies that the amount of displacement is within the allowance range, a step S202 detects the upper left registration mark, based on the positional relationship to the lower left registration mark.

Figure 16:
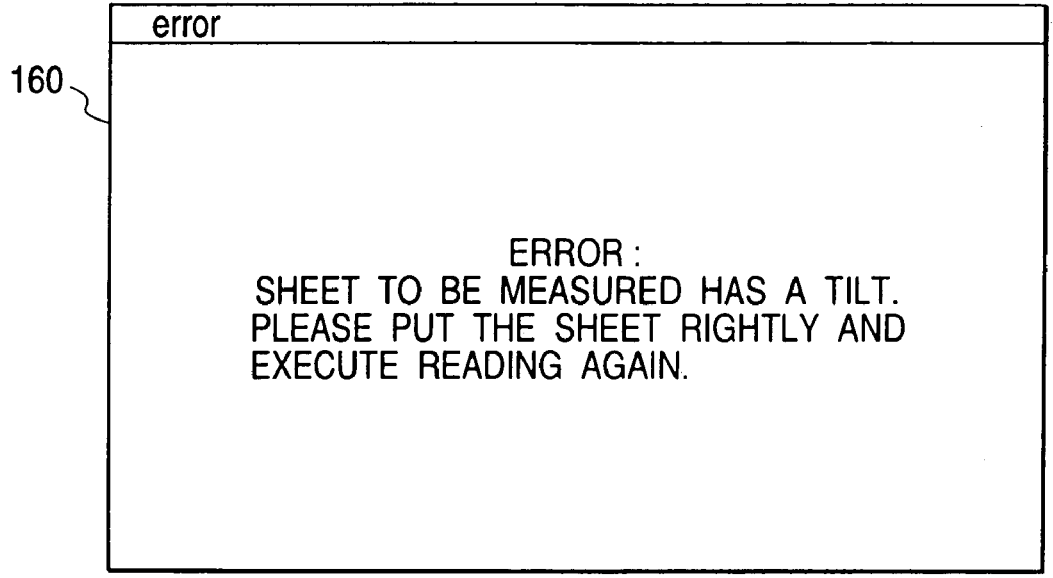
FIG. 16 is a view showing an example of error display in a third embodiment.

If detection is made, a step S203 checks whether the position of such registration mark is within the range of allowance. This is to confirm whether the relative displacement of the upper left registration mark with respect to the lower left registration mark, namely the level of skew, is within the range of allowance. If outside the range of allowance, a step S208 returns a skew error signal. The detection of the upper right registration mark is executed in a similar manner. Referring to the flow in FIG. 20, in a normal state, a step S206 returns a signal indicating the normal state, and, in a skewed state, a step S208 returns a skew error signal, and, if the detection of the registration mark is not possible, a step S207 returns a registration mark detection error signal. Referring to FIG. 19, if a step S191 identifies an abnormal state, a step S192 executes an error display. In case of a registration mark detection error, there is provided a display 173 shown in FIG. 17, and, in case of a skew error, there is displayed an error window 160 shown in FIG. 16.

As explained in the foregoing, the third embodiment provides a method of detecting the skewed placement of the chart on the original supporting table of the scanner and executing error display, thereby realizing calibration of higher precision.

Fourth Embodiment

The present embodiment provides a variation of the scanner chart to be employed in the foregoing embodiments.

In the following there will be explained, with reference to FIGS. 21, 22A and 22B, a format of the scanner chart different from that explained in the foregoing embodiments.

Figure 21:
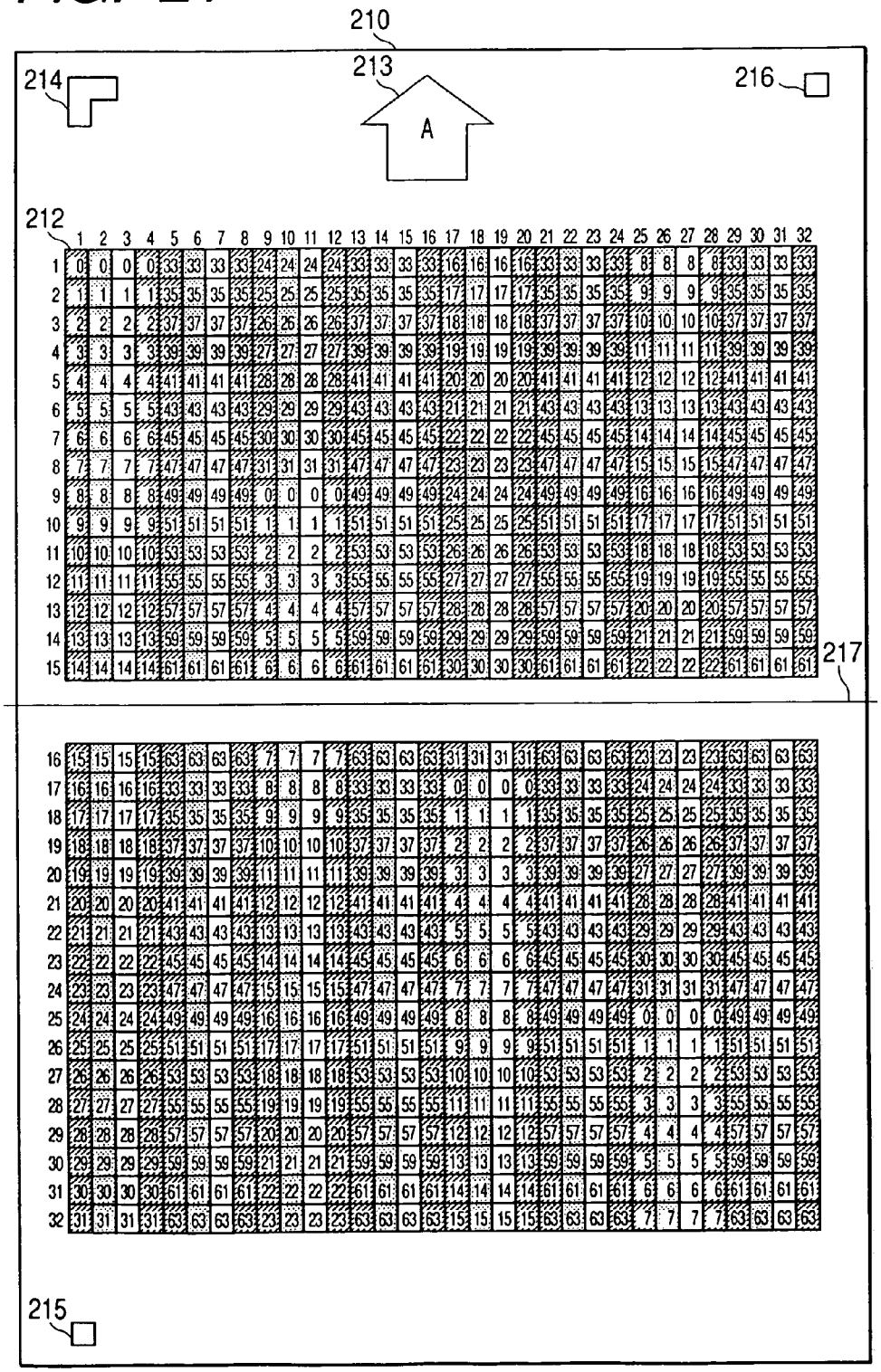
FIG. 21 is a view showing an example of the scanner chart in a fourth embodiment.

FIG. 21 shows an example of the scanner chart of the present embodiment. In FIG. 21, an entire scanner chart is shown by a frame 210 of A4 size. A data portion 212 consists as in the example shown in FIG. 15, of 1024 blocks in total, composed of 32 divisions in the vertical and lateral directions in a page.

Discrimination information 213 is provided in an arrow shape for indicating the direction of the chart when it is placed on the original supporting table of the scanner apparatus, and, in case of the scanner chart, contains therein a letter "A" for causing the user to identify this chart as a scanner chart. Registration marks 214, 215, 216 are similar to those shown in FIG. 15.

A folding margin 217 is provided for folding the chart A in such a manner that the folding margin 217 is positioned inside the fold, and data portions 212 are positioned on both sides of the folding margin 217.

The above-described scanner chart A is a reference sheet, printed in advance for example by offset printing, and has to be stored by the user. The ordinary offset print may be discolored by ultraviolet light. Even in an ordinary office environment, if the user leaves the chart A with the printed side upward close to a window, the chart may be discolored within a relatively short period and may become unusable for the intended purpose.

The chart A in the present embodiment is so designed as to improve the light resistance of such chart in a relatively inexpensive manner.

Figure 22A:
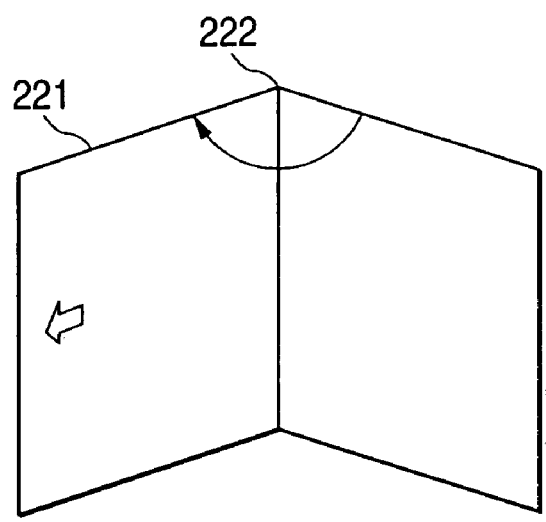
FIGS. 22A and 22B are views showing an example of a method for storing the scanner chart.
Figure 22B:
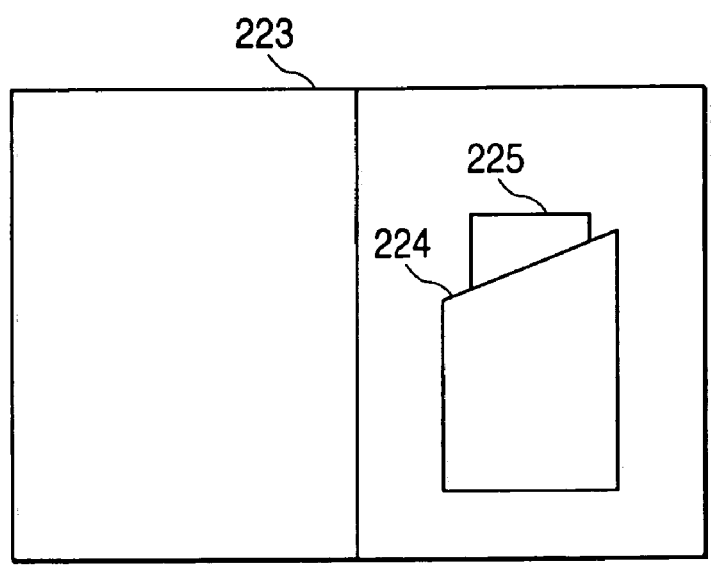

Referring to FIG. 22A, there is shown a chart A 221 with a folding margin 222 corresponding to that 217 shown in FIG. 21. In case of storing the chart A, it is folded at the folding margin 222, with the printed surface inside, as shown in FIG. 22A. FIG. 22B shows a manual 224 to be packed with a calibration software, with a pocket 224 for storing the chart. A chart 225, corresponding to the aforementioned chart 221, is stored in the folded state in the pocket of the manual in order to avoid ultraviolet irradiation to the printed surface. Such configuration can improve the light resistance of the chart A relatively inexpensively, even including the cost of the pocket 224 to be attached to the manual 223.

As explained in the foregoing, the present embodiment considers the storability of the chart thereby improving the precision and the convenience of use.

Other Embodiments

The present invention is applicable to a system consisting of plural equipment or an apparatus consisting of a single equipment. Also the present invention is naturally applicable to a case where the present invention is attained by supplying a system or an apparatus with a program. In such case, a memory medium storing the program of the present invention constitutes the present invention, and the system or the apparatus functions in a predetermined manner by reading such program from the memory medium into such system or apparatus.

The scope of the present invention is defined by the scope of the appended claims, and is not limited at all by the specific descriptions of this specification. Furthermore, all the modifications and changes belonging to equivalents of the claims are considered to fall within the scope of the present invention.

What is claimed is:

1. An image processing method comprising:
   a step of generating a calibration condition for image forming means, by reading a first chart formed by said image forming means with reading means and generating a calibration condition for said image forming means, based on the data obtained by said reading;
   a step of generating a calibration condition for said reading means, using a second chart printed in advance; and
   a discrimination step of discriminating said first and second charts,
   wherein said discrimination step discriminates whether a chart read in each of said step of generating the calibration condition for the image forming means and said step of generating the calibration condition for the image reading means is an appropriate chart.

2. An image processing method according to claim 1, wherein each of said first and second charts is provided with a mark formed by a color corresponding to a kind of the chart; and
   said discrimination step discriminates the color of said mark.

3. An image processing method according to claim 1, further comprising a step of informing to a user when one of the charts is discriminated as inappropriate.

4. An image processing method for generating a calibration condition matching the characteristics of an apparatus based on data obtained by reading a chart, the method comprising steps of:
   detecting, from said data, a mark attached to said chart; and
   discriminating whether said data are appropriate according to a result of said detecting step.

5. An image processing method according to claim 1, further comprising the step of:

informing a user of a fact that the reading position or the resolution in reading said chart is inappropriate, according to a result of said detecting step.

6. An image processing method according to claim 5, further comprising the steps of:

discriminating whether said chart is skewed according to the result of said detecting step; and informing a user of a skewed position when said chart is skewed.

7. An image processing method according to claim 4, further comprising the step of:

informing a user of a fact that a kind of said chart is inappropriate, according to a result of said detecting step.

8. An image processing method according to claim 4, further comprising the steps of:

judging a direction of said chart according to a result of said detecting step; and generating said calibration condition from said detected data according to said direction.

9. An image processing apparatus comprising:

means for generating a calibration condition for image forming means, by reading a first chart formed by said image forming means with reading means and generating a calibration condition for said image forming means, based on the data obtained by said reading;

means for generating a calibration condition for said reading means, using a second chart printed in advance; and discrimination means for discriminating said first and second charts, wherein said discrimination means discriminates whether a chart read by each of said means for generating the calibration condition for the image forming means and said means for generating the calibration condition for the image reading means is an appropriate chart.

10. A computer readable recording medium storing software for an image processing method, the method comprising:

a step of generating a calibration condition for image forming means, by reading a first chart formed by said image forming means with reading means and generating a calibration condition for said image forming means, based on the data obtained by said reading;

a step of generating a calibration condition for said reading means, utilizing a second chart printed in advance; and a discrimination step of discriminating said first and second charts, wherein said discrimination step discriminates whether a chart read in each of said step of generating the calibration condition for the image forming means and said step of generating the calibration condition for the image reading means is an appropriate chart.

* * * * *